(No Model.)
B. M. SOULE.
RUNNING GEAR FOR BUGGIES.
No. 248,361. Patented Oct. 18, 1881.
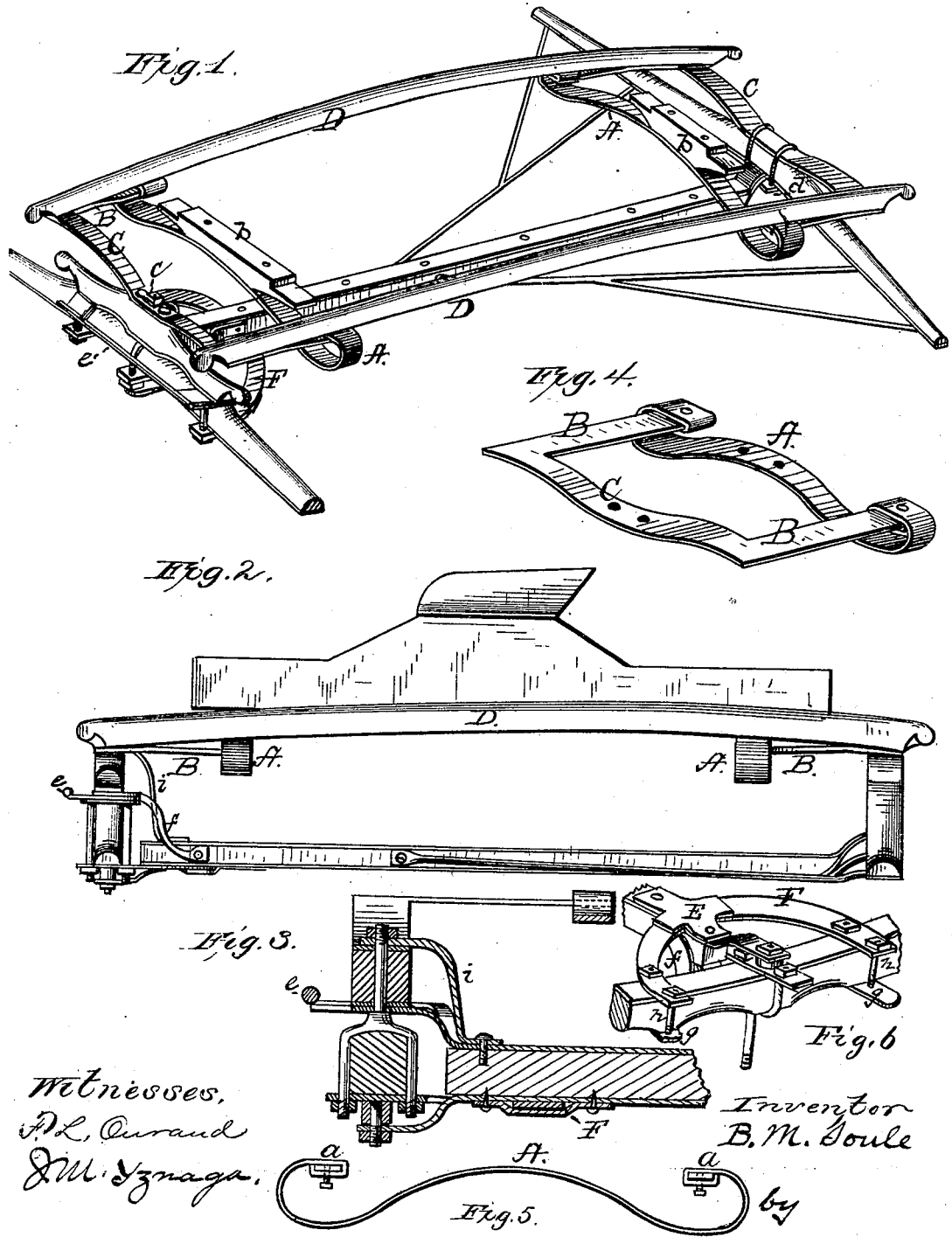

ated October 18, 1881.

UNITED STATES PATENT OFFICE.

BUREN M. SOULE, OF CEDAR RAPIDS, IOWA, ASSIGNOR TO AREBELLA C. SOULE, OF SAME PLACE.

RUNNING-GEAR FOR BUGGIES.

SPECIFICATION forming part of Letters Patent No. 248,361, dated October 18, 1881.

Application filed May 7, 1881. (No model.)

*To all whom it may concern:*

Be it known that I, BUREN M. SOULE, a citizen of the United States, residing at Cedar Rapids, in the county of Linn and State of Iowa, have invented certain new and useful Improvements in Running-Gear of Buggies and Similar Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the running-gear of buggies and similar vehicles.

My improvement consists in a transverse curved or semi-elliptical spring with scroll ends of a peculiar construction.

My improvement also consists in the combination of a semi-elliptical spring with scroll ends fitting over and attached to the ends of horizontal springs running parallel with the side bars of a buggy-gear.

My improvement also consists in the combination of a semi-elliptical spring with scroll ends fitting over and attached to the ends of horizontal springs running parallel with the side bars of a buggy-gear, said horizontal springs being part of or rigidly attached to a semi-elliptical spring secured to the hind axle or the bolster-piece of a buggy or similar vehicle.

My invention further consists in the novel construction and arrangement of the parts of a fifth-wheel of a buggy or similar vehicle, as will be hereinafter set forth.

My improvement also consists in the novel construction of means for coupling a buggy or similar vehicle, as will be hereinafter more specifically described.

My improvement further consists in the novel construction and arrangement of the parts, as will be hereinafter more fully set forth and specifically claimed.

In the accompanying drawings, Figure 1 represents a perspective view of my invention attached to the axles of a vehicle. Fig. 2 is a side view of the same, showing the body of a vehicle attached. Fig. 3 is a longitudinal central sectional view of the forward portion of the running-gear with the side bar omitted. Fig. 4 is a perspective view of my improved spring. Fig. 5 is an end view of the improved elliptical or curved spring, showing fully the scroll ends and the sockets to receive the side springs; and Fig. 6 is a perspective view of the middle portion of the front axle, having attached to its under side a semicircular plate which aids in supporting the forward end of the reach and the lower part of the fifth-wheel.

The letter A represents a transverse spring semi-elliptical in form until near the ends, which are turned upward and scrolled inwardly, terminating in formed sockets *a*, substantially as shown in Fig. 5. In constructing this spring the ends are bent around a former and the free ends welded to the under side of the upper wall of the socket, which conforms to the size and form of the ends of the horizontal springs, over which they are afterward forced and secured by a bolt.

The letter B represents horizontal side springs attached to the forward and rear ends of the side bars of the vehicle. These horizontal springs may form an integral part of the transverse semi-elliptical spring C, which runs parallel with the spring A; or they may be secured firmly thereto by clips or bolts. The sockets of the semi-elliptical scrolled spring A are slightly beveled, and are driven over the free ends of the horizontal springs B and secured by screw-bolts. The spring being completed substantially as shown in Fig. 4, it is ready for attachment to the side bars and to the bolster or hind axle of a buggy or similar vehicle. This is accomplished by means of clips or equivalents at the central part of the axle or bolster and at the ends of the side bars, D. The box or body of the buggy or vehicle is attached to transverse blocks or bars *b*, supported on the semi-elliptical scrolled springs A by clips or bolts or rivets of requisite strength, substantially as seen, Fig. 2.

It will be observed that by the peculiar form of the spring A, I obtain the quality of meeting exigencies of pressure, and, in connection with the other springs, B and C, I get a longitudinal and vertical movement which allows the spring A to shorten or lengthen at the scroll, thus obtaining a spring free from jars, concussions, or unusual strain. The forward semi-elliptical spring is fastened to the bolster by clips, and has also a central perforation, c, for the passage of the king-bolt. The rear semi-elliptical spring is secured to the hind axle by clips or similar means. The front semi-elliptical spring, C, the bolster, and the T-shaped plate of the coupling-strap have a bolt-hole, through which the king-bolt is passed. The stirrup of the king-bolt clamps the front axle firmly, and the bolt, being secured at the upper end by a nut, prevents separation of the parts, and at the same time permits the axle to play when turning the buggy about.

To the under side of the bolster is rigidly fastened the T-shaped plate of the upper coupling-strap. The straps of the coupling or reach may extend the whole length thereof, or they may, at either end, extend but part way of the length. The upper strap of the coupling or reach at the end of the reach extends upward, branching in opposite directions, and, as stated, is fastened rigidly to the under side of the bolster by means of bolts or clips. The under strap of the coupling, at the forward end, is continued forward beyond the end of the reach and bent down slightly and attached to the under screw-threaded portion of the king-bolt by means of an interposed washer and nut. The lower strap of the coupling, at the rear end, is bent upward with the end of the reach until it reaches the upper strap, where they are suitably and firmly united, and thence curved or bent upward, and terminate in the transverse plate d, which is secured to the under side of the axle by clips. Also, the center of the reach and the rear axle are braced by the diagonal brace-rods, as seen in Fig. 1 of the drawings.

It will be seen that by this improved construction of the connecting termini of the reach the reach is thrown below the line of the axles, and in connection with the arrangement of the fifth-wheel, as hereinafter described, I am enabled to place the body of the buggy on the springs lower than in the construction and devices now used. By the same means I adjust the center of gravity lower and materially lessen the liability of upsetting or displacement of the body by jarring, and at the same time I obtain a secure and substantial coupling of all the parts.

It will also be observed that the several parts of the buggy are in a more than ordinary line with the power.

To the under side of the bolster is rigidly secured the transverse plate of the upper coupling-strap, and to this plate are secured the upper plates of the fifth-wheel, which extend forward of the axle and bolster a short distance, and are firmly connected by the transverse bar or rod e. These upper plates also extend rearward a few inches beyond the bolster, and to these extended parts are riveted the connecting-straps f, which are curved toward and bolted or otherwise fastened to the sides of the reach, substantially as shown in the drawings. (See Fig. 6.)

The letter g represents the under or bearing plates of the fifth-wheel, and these are fastened by the bolts h, which extend down the sides of the axle, and are held by the nuts on the under side of the circle, hereinafter described.

The letter E represents a strap clipped or bolted to the axle and formed with circular extensions, which form the bearings for the semicircle-plate to move through.

The letter F represents a semicircular plate which forms the base of the clips under the axle for the bolts, extending from the under plates of the fifth-wheel, and from thence extending rearward under the bearing-plate of the reach, and serves as a stay to the axle, prevents rocking, and lessens the liability of the king-bolt breaking. The under plates of the fifth-wheel, on the rear of the axle, are cut off about two inches from the axle, in order that they will not pass the upper plate when turning.

It will be observed that if the under plates of the fifth-wheel are made as long as the upper plates the end would strike the body of the buggy when turning around.

The letter i represents a strap bolted to the reach, and passes up over the bolster and on the bolt of the king-bolt and there secured by the nut of the king-bolt. The office of this brace-strap is to give additional security to the parts which it connects.

I do not wish to confine myself to the specific construction of the parts shown in the drawings, as they may be varied without departing from the spirit of my invention.

What I claim as my invention, and desire to secure by Letters Patent, is—

1. The combination of the semi-elliptical spring A with socket ends, the horizontal springs B B, and the semi-elliptical spring C, constituting a rectangular spring-frame, substantially as described.

2. The combination, with the side bars, D D, of the rectangular spring-frames composed of the curved springs A with scroll and socket ends, the horizontal springs B B, and the semi-elliptical springs C, arranged in sets on the bolster and rear axle of the running-gear, substantially as shown and described.

3. In a running-gear of a vehicle, a semicircular plate, F, attached to the under side of the front axle and passing through a loop or strap attached to the under side of the reach, substantially as described.

4. In a running-gear of a vehicle, the combination, with the front axle, of the lower section of the fifth-wheel and the semicircular plate F, secured to said axle by means of clip-bolts, substantially as described.

In testimony whereof I affix my signature in presence of two witnesses.

BUREN M. SOULE.

Witnesses:
I. N. WHITTAM,
JAMES J. CHILD.